(12) United States Patent
Van Den Enden

(10) Patent No.: US 6,690,640 B1
(45) Date of Patent: Feb. 10, 2004

(54) SYSTEM FOR STORING AND/OR REPRODUCING INFORMATION

(75) Inventor: Gijsbert J. Van Den Enden, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 147 days.

(21) Appl. No.: 08/984,829

(22) Filed: Dec. 4, 1997

(30) Foreign Application Priority Data

Dec. 6, 1996 (EP) .............................. 96203391

(51) Int. Cl.⁷ ................................ G11B 7/00
(52) U.S. Cl. ................................... 369/275.4
(58) Field of Search ............... 369/48, 275.2, 369/275.3, 47, 275.4, 54, 58

(56) References Cited

U.S. PATENT DOCUMENTS

| | | | | |
|---|---|---|---|---|
| 4,901,300 A | | 2/1990 | Van Der Zande et al. | 369/47 |
| 5,111,345 A | * | 5/1992 | Muller | 369/32 |
| 5,187,699 A | | 2/1993 | Raaymakers et al. | 369/48 |
| 5,418,764 A | * | 5/1995 | Roth et al. | 369/48 |
| 5,751,689 A | * | 6/1995 | Hoshino et al. | 369/84 |
| 5,751,671 A | * | 5/1998 | Koike et al. | 369/84 |
| 5,809,007 A | * | 9/1998 | Takemuras et al. | 369/275.3 |
| 5,828,639 A | * | 10/1998 | Kobayashi et al. | 369/58 |
| 5,831,954 A | * | 11/1998 | Sako et al. | 369/58 |

FOREIGN PATENT DOCUMENTS

| | | |
|---|---|---|
| JP | 4307471 | 4/1991 |
| WO | WO9634389 | 10/1996 |

* cited by examiner

Primary Examiner—Nabil Hindl

(57) ABSTRACT

Information is represented on the track or tracks of a record carrier by marks organised into bit cells having a constant bit length $B_l$. For indicating the track, the record carrier has a servopattern in which a winding number is coded in each winding of the track. The ratio between the track pitch and the bit length is determined in such a way that the increase of the length of the windings corresponds between consecutive windings to an integral number of bits. Thus, the position of an information block somewhere in the track is determined from the ratio and the winding number in a simple manner and with great accuracy, because no rounding errors are produced when a computation using integers is performed. The device is provided with clock apparatus for generating a bit clock synchronously with the bit cells during scanning of the track, the clock apparatus generates the bit clock in a predetermined relation with the track pitch $T_p$, such that $m*B_l=n*\pi*T_p$, in which n and m are integers which are larger than or equal to 1.

29 Claims, 3 Drawing Sheets

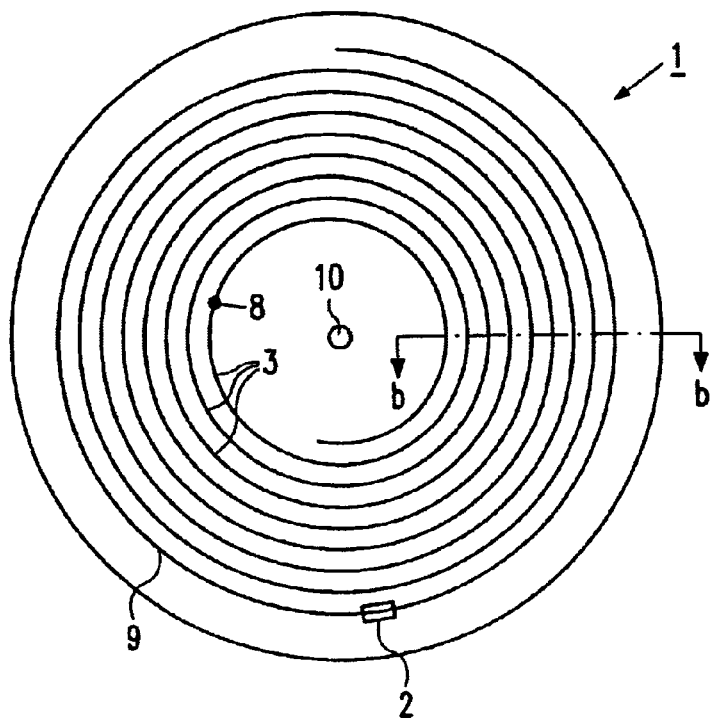
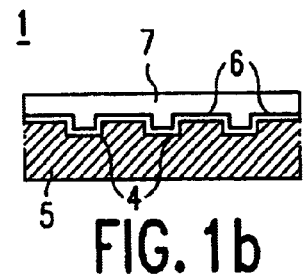
FIG. 1a
FIG. 1b
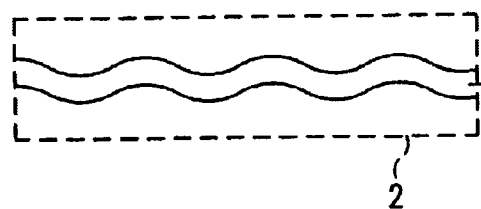
FIG. 1c
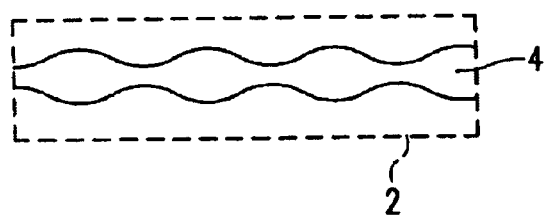
FIG. 1d

SYSTEM FOR STORING AND/OR REPRODUCING INFORMATION

The invention relates to a system for storing and/or reproducing information, comprising a disc-shaped record carrier and a device provided with means for writing and/or reading information in/from a track on the record carrier, which track is arranged in accordance with a spiral pattern of windings, the information being represented by marks constituted by bit cells having a bit length.

The invention also relates to a record carrier for use in such a system, which record carrier is provided with a servopattern arranged in accordance with a spiral pattern of windings indicative of a track intended for recording, the information being represented by marks constituted by bit cells having a predetermined bit length $B_l$.

The invention further relates to a device for writing and/or reading information for use in such a system, comprising means for writing and/or reading information in/from a track on a disc-shaped record carrier, which track is arranged in accordance with a spiral pattern of windings having a predetermined track pitch $T_p$, the information being represented by marks constituted by bit cells having an at least substantially constant bit length $B_l$, and clock means for generating a bit clock synchronously with the bit cells during scanning of the track.

A system of the type described in the opening paragraph, comprising a record carrier and a device for reading and/or writing information, is known from WO 96/34389 (PHN 15.333). The known record carrier is provided with a spiral track of windings intended for recording information blocks, in which the information is represented by a succession of optically readable marks. The mark's are constituted by bit cells, each of which represents a channel bit via a channel code such as, for example the known EFM code in the Compact Disc (CD) and the recordable CD-R. Moreover, the record carrier is provided with a servopattern having a periodical modulation, in which disc information is coded such as, for example writing parameters. This modulation has a fixed number of periods per winding so that, based thereon, the record carrier can rotate at a constant angular velocity (CAV). The known device is provided with drive means for rotating the record carrier and with a read and/or write unit for scanning the record carrier via a beam of electromagnetic radiation. The device is provided with clock means for generating a bit clock which, upon scanning of the track, is synchronous with the bit cells for writing and/or regaining the channel bits. Moreover, the device is provided with means for positioning the information blocks on a desired winding and angular position in the track. In concentric zones, a fixed number of information blocks per winding can be positioned per zone and the bit clock is constant so that the bit length in the zone increases from the inside to the outside. From zone to zone, the number of information blocks per winding increases. In another embodiment, the bit length and hence the information density is constant, and the information blocks of equal length are recorded one after the other in the track. The bit clock is generated in dependence upon the rotational speed and the radial position of the relevant winding. When a bit length is used which is minimally detectable during reading, a maximal average information density is realized.

A problem in the known system is that the position of information blocks in the track must be computed accurately. When using a constant density, the length of the track should be computed up to the desired position of, an information block, and the exact dimensions of the track must be included in a standard. When using zones, a large number of characteristic numbers must be taken up in a table in the form of a standard so that the characteristic numbers can be introduced in any other device. This renders a reading and/or writing device complex. Moreover, the standard with which the device and the record carrier must comply should comprise a large number of very, accurate data.

It is, inter alia, an object of the invention to provide a system comprising a record carrier and a device for reading and/or writing information of a high density, in which the position of an information block can be computed in a simple and accurate manner.

In accordance with a first aspect of the invention, a system as described in the opening paragraph for storing and reproducing information is therefore characterized in that the lengths of consecutive windings differ by an integral multiple and/or a rational fraction of the bit length.

In accordance with a second aspect of the invention, a record carrier of the type described in the opening paragraph is therefore characterized in that the windings on the record carrier are arranged at a track pitch $T_p$ such that $n*\pi*T_p = m*B_l$, in which n and m are integers and are larger than or equal to 1.

In accordance with a third aspect of the invention, a device of the type described in the opening paragraph is therefore characterized in that the clock means are adapted to generate the bit clock in a predetermined relation with the track pitch $T_p$, such that $m*B_l = n*\pi*T_p$, in which n and m are integers and are larger than or equal to 1.

The inventive measures have, inter alia, the advantage that the number of bit cells preceding the position of the information block in a given winding of the track can be computed exactly when computing the position of an information block. In the case of an integral number of bit lengths per winding, the computation can be simply performed with integers, so that no rounding errors are produced. A rational fraction, for example 0.5, can also be processed in a computation in a simple and exact manner. Moreover, due to the use of an at least substantially constant bit length, the information density is maximal at given optical system parameters. Furthermore, there are no large discontinuities in the frequency of the bit clock. In the known system, these discontinuities occur at the transition between the zones and an ample distance between the information blocks is required for their compensation. In the system according to the invention, however, the appropriate bit clock can be computed easily and accurately at any radial scanning position.

The invention is also based on the recognition that, since the length of consecutive windings increases with $2*\pi*T_p$ at a track pitch $T_p$, the cumulated error over a large number of tracks without a rational proportion: between bit length and track pitch may differ in the computation in different devices in such a way that position deviations are produced, with information blocks partly overlapping each other. This leads to irreparable errors in the reproduction of the information.

An embodiment of the record carrier according to the invention is characterized in that a reference point is provided in the track at a radius R, such that the length of the winding from the reference point is an integral multiple and/or a rational fraction of the bit length. This has the advantage that the number of bit cells per winding can be exactly computed when the windings are counted from the reference point.

A further embodiment of the record carrier according to the invention is characterized in that the servopattern is provided with a modulation in which modulation disc information is coded, said disc information comprising track pitch information which is indicative of a ratio between the bit length and the track pitch. The ratio can be indicated with a limited number of bits by means of a number which is indicative of the ratio which is an integral number or possibly a simple rational fraction. This has the advantage that a device can read the relevant ratio from the record carrier without rounding errors. Moreover, several bit lengths may be used at a given track pitch in a simple manner in the system, while the device can always derive the bit length to be actually used from the track pitch information.

An embodiment of the device according to the invention is characterized in that the clock means are adapted to generate the bit clock during scanning of a part of the track in dependence upon a radius R on which a reference point is provided, the number of windings between the reference point and the part, and the track pitch. This has the advantage that the correct bit clock can be computed on the basis of known data, namely the length of a reference winding from the reference point at radius R, the winding number from the reference winding and the track pitch. Moreover, upon a jump to a new position, the bit clock can be computed already during the jump and set at the right value.

A further embodiment of the device according to the invention, in which the record carrier is provided with a servopattern which is indicative of the track, is characterized in that, while a predetermined number of synchronizing elements per winding is present in the servopattern, the clock means are adapted to generate the bit clock in dependence upon the synchronizing elements and the radial position of the winding. The rotational speed of the record carrier is generally controlled via a control loop on the basis of servo-information from the servopattern, while small deviations from the nominal speed may occur. The embodiment has the advantage that the bit clock is adapted to the actual rotational speed, so that the bit length is more accurate.

These and other aspects of the invention are apparent from and will be elucidated with reference to the embodiments described hereinafter.

In the drawings:

FIG. 1 shows a record carrier provided with a servopattern,

In the Figures, elements which correspond to elements already described have the same reference numerals.

Figure 2:
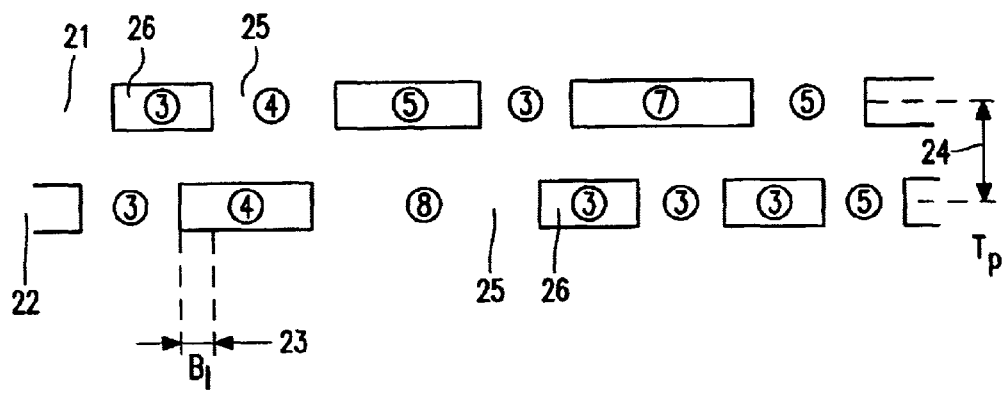
FIG. 2 shows diagrammatically a pattern of marks in adjoining tracks.

FIG. 1a shows a disc-shaped record carrier 1 provided with a track 9 intended for recording and a central hole 10. The track 9 is arranged in accordance with a spiral pattern of windings 3. FIG. 1b is a cross-section taken on the line b—b of the record carrier 1, in which a transparent substrate 5 is provided with a recording layer 6 and a protective layer 7. The recording layer 6 may be optically writable, for example via phase change, or magneto-optically writable by a device for writing information such as the known CD-Rewritable or CD-Recordable. The recording layer may also be provided with information via a production process, in which first a master disc is made which is subsequently multiplied through pressing. The information is organized in information blocks and is represented by optically readable marks in the form of a succession of areas reflecting much radiation and little radiation such as, for example a succession of pits of different lengths in a CD. In one embodiment, the track 9 on the record carrier of a rewritable type is indicated by a servopattern which is provided during manufacture of the blank record carrier. The servopattern is formed, for example by a pregroove 4 which enables a write head to follow the track 9 during scanning. The pregroove 4 may be implemented as a deeper or a raised part, or as a material property deviating from its ambience. Alternatively, the servopattern may consist of an alternation of elevated and deeper windings, referred to as land and groove patterns, with a transition from land to groove or vice versa taking place per winding. Such a rewritable disc is provided in the system of the novel high-density optical disc, the Digital Versatile Disc (DVD) and is referred to as DVD-RAM. FIGS. 1c and 1d show two examples of a periodical modulation (wobble) of the pregroove. This wobble produces an extra signal in a tracking servosensor. The wobble is, for example frequency-modulated, and position information such as an address, a time code or winding information is coded in the modulation. A description of a rewritable CD system which is provided with position information in such a way can be found in U.S. Pat. No. 4,901,300 (PHN 12.398) and U.S. Pat. No. 5,187,699 (PHQ 88.002). A servopattern may also consist of, for example regularly distributed sub-patterns which periodically cause tracking signals. This description is based on information storage in a spiral track pattern which is filled from the inner winding to the outer winding, for example as in a CD-ROM.

FIG. 2 shows diagrammatically a fragment of the record carrier provided with marks. A first track 21 is written with a series of marks 25, 26 having different lengths, as is denoted by the encircled numbers. Moreover, FIG. 2 shows a second track 22 adjoining the first track 21 and also being written with marks 25, 26. The mutual distance between the centerlines of the tracks is denoted by the track pitch $T_p$ and indicated by the arrow 24. The encircled numbers in the marks indicate a number of bit cells from which the mark is formed. The marks have a limited number of possible lengths, for example between 3 and 11, such as the pits and spaces between the pits in the CD. Each bit cell represents the value of a channel bit, with a number of channel bits jointly constituting a symbol via a channel code such as the Eight to Fourteen Modulation channel code (EFM) of the CD. The bit length $B_l$ of a bit cell is indicated by an arrow 23. During scanning, the value of each channel bit is determined at an instant indicated by a bit clock which runs synchronously with the bit cells. To achieve a high information density, the bit length is of course chosen to be as small as possible. This bit length is determined by the optical parameters of the system, such as the wavelength of a read or write beam and the optical components used, and the bit length $B_l$ is thereby determined for a given system.

According to the invention, the track on the record carrier is provided at a track pitch such that the lengths of consecutive windings differ by an integral multiple and/or a rational fraction of the predetermined bit length. In this case, the bit length $B_l$ is fixed as a system requirement in dependence upon optical characteristics of the system. At this bit length determined by system parameters, the track pitch is chosen to be such that this increase of the length per winding corresponds to a fixed number of bit lengths and possibly also a simple rational fraction such as 0.5 or 0.25 bit length. Per winding, the length of the winding increases with a fixed length, namely $2*\pi*T_p$, because the circle $T_p$ has a larger radius so that the following relation applies at the bit length $B_l$ and the number of extra bit lengths $B_x$ per winding:

$$T_p = \frac{B_x B_l}{2\pi}$$

A practical value in the optical parameters of the DVD system is a bit length of 0.17333 μm and an extra number of bits $B_x$ of 29, at which the track is to be provided on the record carrier at a track pitch $T_p$ of 0.80000 μm. $B_x$ may also be expressed in a formula via a rational number m/n. The numbers m and n should then be chosen to be such that $B_x$ is an integral number or possibly an integral number and a simple rational fraction.

$$B_x = \frac{2\pi T_p}{B_l} = \frac{2m}{n}$$

For the system, the relation between the track pitch and the bit length can generally be given by: $n*\pi*T_p = m*B_l$ in which n and m are integers which are larger than or equal to 1. At n=2, m is equal to the number of full bit lengths added to the length per winding. At n=4, m will be the number of half bit lengths, at n=8 the number of quarter bit lengths, etc. If the number of bit lengths $B_{ref}$ of a reference winding is known, the total number of bit cells from the reference winding to a point in the track can be computed in a simple manner. The system is then defined by fixing the two characteristic numbers $B_{ref}$ and $B_x$, namely the number of bit lengths in winding 0 (the reference winding) and the increase of the number of bits per winding, which characteristic numbers must correspond to the track pitch and the location of the reference winding, as described below. The number of bit cells $S_t$ in the spiral up to a winding number $N_t$, which is situated $N_t$ times the track pitch $T_p$ further outward than the reference winding is:

$$S_t = B_{ref} N_t + \sum (B_x + 2B_x + 3B_x \ldots (N_t - 1)B_x) = B_{ref} N_t + \frac{1}{2} N_t (N_t - 1) B_x$$

When the reference winding is situated from a reference point 8 (in FIG. 1) at radius R, it holds for the number of bits $B_{ref}$ in the reference winding:

$$B_{ref} = \frac{2\pi\left(R + \frac{T_p}{2}\right)}{B_l} = \left(\frac{R}{T_p} + \frac{1}{2}\right) B_x$$

while the number of bits $B_t$ in a more remote winding $N_t$ is equal to:

$$B_t = \frac{2\pi\left(N_t T_p + R + \frac{T_p}{2}\right)}{B_l} = N_t B_x + B_{ref}$$

and the number of bits $S_t$ in the spiral up to $N_t$ can be expressed as:

$$S_t = \frac{2\pi\left(N_t^2 \frac{T_p}{2} + N_t R\right)}{B_l}$$

The relation between an information block $N_b$ consisting of k bit cells and a length $k*B_l$ and the winding $N_t$ in which this information block is situated can be determined therefrom:

$$N_t = \sqrt{\left(\frac{R}{T_p}\right)^2 + \left(\frac{N_b k B_l}{\pi T_p}\right)} - \frac{R}{T_p} = \sqrt{\left(\frac{B_{ref}}{B_x} - \frac{1}{2}\right)^2 + \frac{2k N_b}{B_x}} - \left(\frac{B_{ref}}{B_x} - \frac{1}{2}\right)$$

If, after computation for a desired block $N_b$, the result $N_t$ appears to be 257.155, then it follows that the winding number is 257 and the position within the winding is 15.5% of the total winding. If the winding is divided into 8 segments, this is then segment number $N_s$=1 (position= 0.125) and 0.03*8=24% within the segment, and if the segment is further divided into, for example 12 intervals, then this is interval 2 and fraction 0.88. The enumerations always start from 0 in this case. This fraction can be counted down within the interval so as to find the exact position.

The location of the information block $N_b$ may also be determined by means of an iterative approach. First, a rough position is determined, for example via a table, in which the position is stated for a limited number of blocks. The table states, for example 100 entries consisting of a block number and an associated winding number and the displacement of the angular position, and possibly also the length of the relevant winding in bit lengths. For the DVD-RAM, the winding number may be given as a figure Winding number$_{table}$ of 16 bits and the displacement as a figure Shift$_{table}$ of 21 bits, and the length of the winding as a figure Winding length$_{table}$ of 21 bits. The number of bits in the figures is then adapted to the maximally occurring numbers. The displacement is determined with respect to the beginning of the winding, hence from the reference angular position determined by the reference point 8 on radius R. Such a table may be permanently stored in a non-volatile memory in the drive but may also be computed after switching on the drive or after insertion of a record carrier into the drive and then stored in a data memory. The position of an information block can be computed by taking the nearest entry in the table as a starting point. From the given shift Shift$_{table}$ for a block Block number$_{table}$ the length of a block can be repeatedly added and a displacement can be determined until the desired block $N_b$ is reached:

Shift=Shift+Block length
Block number=Block number+1
If Shift≧Winding length Then
  Shift=Shift−Winding length
  Winding number=Winding number+1
  Winding length=Winding length+$B_x$ In this way the exact position of an information block can be computed by way of a repeated addition only.

At a different choice of the reference point 8 on a radius of R−$T_p$/2, at which the alternative reference winding thus extends from radius R−$T_p$/2 to R+$T_p$/2, there will be a different relation between the radius R and the number of bit lengths $B_{ref2}$ and $B_x$:

$$B_x = \frac{2\pi T_p}{B_l} \qquad B_{ref2} = \frac{2\pi R}{B_l} = \left(\frac{R}{T_p}\right) B_x$$

The other formulas can be determined in a corresponding manner.

In an embodiment of the system, a ratio between track pitch and radius R, in addition to $B_x$, can be fixed via a standard in track pitch information, namely the ratio:

$$P = \frac{R}{T_p} = \frac{B_{ref}}{B_x} - \frac{1}{2} = \frac{B_{ref2}}{B_x}$$

In the drive or on the record carrier, other characteristic numbers such as the number of k bit cells per information block and the maximum value of the winding number $N_t$ are also fixed.

In an embodiment of the record carrier according to the invention, each winding 3 is provided with winding information in the part intended for recording. The winding information comprises a unique code per winding 3, indicating, for example the radial position of the winding. A simple example of such a code is a winding number which counts up, for example from 0 from the inner winding to the outer one. To decode the winding information, it is advantageous when the modulation of the pregroove extends in such a way that a constant frequency is produced upon reading, independent of the radial position. A modulated signal having a constant frequency can be satisfactorily separated from interference signals by means of a simple filter. To this end, the period of spatial modulation preferably increases proportionally with the distance to the rotation point 10. This produces a constant modulation frequency at a constant angular velocity of the record carrier. It is alternatively possible to choose a different variation of the spatial modulation period and an associated variation of the angular velocity, for example a decrease of the angular velocity at an increase of the radial distance to the rotation point 10. For a record carrier which is writable with a constant information density, the difference between the highest and the lowest information speed is limited thereby. The spatial modulation period is then chosen in conformity with the variation of the angular velocity, such that the period multiplied by the angular velocity and divided by the radial distance is constant. To be able to rapidly verify the precise winding after a jump, it is advantageous to repeat the winding information several times per winding in winding information segments. Such a winding information segment must be independently decodable. A satisfactory protection against local damage is also obtained in this manner. It is attractive to give the winding information segments successive numbers by means of an angular number so that an indication is available about the angular position with respect to the imaginary line 8 where the winding numbers change in a spiral track. In another embodiment, the servopattern is provided with synchronizing elements in the form of, for example short, strong pulses in the wobble, referred to as Fine Clock Marks (FCM). The angular position of the scanning position with respect to a reference point can be accurately determined by a fixed number of these synchronizing elements per winding, for example $N_{fcm}$=96. This reference point may be a fixed point on a radius R, as described above, or another suitable angular reference such as change from land to groove in a land/groove servopattern. For positioning an arbitrary information block, the desired radial position and the desired angular position must be computed. Per information block, an address which is indicative of the position is allocated and this address is preferably also taken up in a header in the information block itself. It is advantageous to provide the information blocks with a simple address, for example a block number consecutively numbering the information blocks. A constant information density can be achieved by writing information blocks of equal length and positioning them at equal distances in the direction of the track. It can be exactly determined on a record carrier according to the invention in which winding and at which angular position an information block having a given block number starts, because the dimensions can be determined in an integral number of bit lengths without rounding errors when computing the position. It is then important to lay down the dimensions of the track, particularly the track pitch, with respect to the bit length in a standard and to start from this ratio of the bit length with respect to the track pitch given in this standard when computing the position. The dimensions of the track at a given bit length are completely determined by the characteristic numbers $B_{ref}$, the number of bit lengths in the reference winding, and $B_x$, the number of extra bit lengths per winding.

Figure 3:
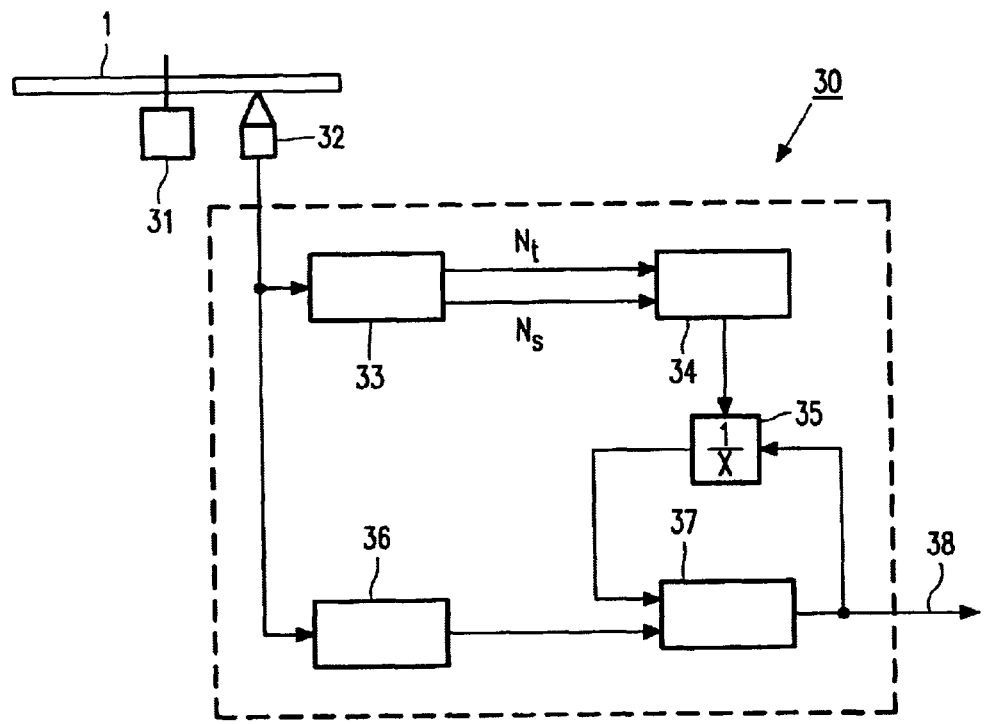
FIG. 3 shows a device for generating a bit clock.

FIG. 3 shows a device for generating a bit clock in accordance with the invention on the basis of synchronizing elements of the record carrier 1, which is rotated by means of a motor 31. The motor 31 may rotate at a fixed speed, or the rotational speed may be controlled on the basis of the servopattern. The track is scanned in the conventional manner by a read head 32 via a beam of electromagnetic radiation. During reading, the servopattern is scanned and a servosignal is generated for controlling the position of the read head by servomeans of a conventional type (not shown). In the device according to the invention, disc and winding information is first regained from the servosignal by the demodulator 33, for example by demodulating the wobble signal. This winding information comprises, for example a winding number $N_t$ of the relevant winding and possibly also a number $N_s$ of the relevant segment, which numbers are passed on to a computing unit 34. Secondly, the synchronizing elements, for example the pulses in the wobble signal due to the FCM are detected from the servosignal by a pulse detector 36. These detected pulses are coupled to a phase-locked loop (PLL) circuit 37 in which they are compared with a fraction of the bit clock 38 at the output of the PLL 37. This fraction is constituted by a variable divider 35 which divides the bit clock 38 by an adjustable dividend X. The dividend X is now computed by the computing unit 34 from the position data (winding number $N_t$ and possible segment number $N_s$) and the track pitch which is known, for example from a standard or which is present in the disc information on the record carrier. At a number of $N_{fcm}$ synchronizing elements per winding, it holds that:

$$X = \frac{B_t}{N_{fcm}} = \frac{2\pi(N_t T_p + R + T_p/2)}{B_l N_{fcm}}$$

The dividend X can be computed once per winding and adjusted in the divider 35. In another embodiment, the dividend X may be redetermined less frequently or more frequently, for example per segment. The more frequently the dividend is adjusted, the more accurate the bit clock has the frequency associated with the radial position and, hence, the more accurately the bit length is constant. During continuous scanning, it is desirable to render the steps in the change of the bit clock as small as possible. The dividend X is preferably raised by only one each time. This raise should result in $B_x$ extra bit clocks per revolution and by applying this raise for the synchronizing element ($N_{fcm}-B_x$), exactly the desired number $B_x$ of extra bit clocks will be generated. In fact, X is equal to the number of bit clocks between two synchronizing elements and $B_x$ synchronizing elements still follow, with an extra bit clock being generated every time. For example, at $B_x$=29 and $N_{fcm}$=96, the dividend X is raised by one from FCM=67.

The dividend X may also be computed in advance for a desired position on the basis of a desired address, for example when performing a jump instruction. In that case, the computing unit of a system control unit will acquire the information about the winding number and possible segment number, which system control unit has computed these data from the address as described with reference to FIG. 2. It is then an advantage that, when the jump is being performed, the bit clock can already be set to the new value which it should have upon arrival at the desired radial position.

In an embodiment of the device, the clock means are adapted to control the deviation of the quantity of clock pulses of the bit clock with respect to the computed quantity of bit cells in the scanned part of the track. To this end, the clock means are provided with a counting member which counts the number of bit clock pulses from a reference instant, for example from the synchronizing elements. If, for example, a raised number of pulses has been found between two synchronizing elements, an unlocked state of the clock means will be found at a deviation above a given limit value and the writing (or reading) operation is interrupted. Subsequently, the writing operation is performed again after the bit clock has been corrected. At a limited raise, the bit clock is corrected during the writing operation. In an uninterrupted writing operation, the bit clock is preferably corrected by a difference signal based on the totally cumulated difference of the number of bit clock pulses and the desired, computed number of pulses. Consequently, after a temporary upward deviation, the bit clock will first go to a too low frequency before it reaches the nominal value so that the integral of the deviations becomes 0. As a result, the total number of written bit cells will exactly correspond again to the compiled quantity, with only a small local offset having occurred. This offset will generally be at most of the same order as deviations which are produced by out-of-roundness or by eccentricity of the track or deviations of the rotation drive.

Figure 4:
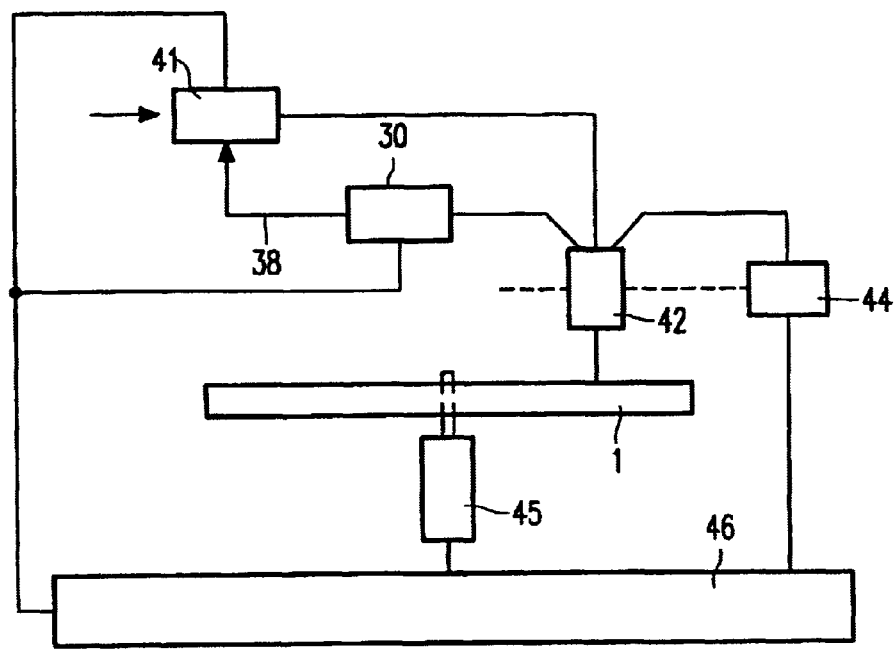
FIG. 4 shows a device for writing information blocks.

FIG. 4 shows a device for writing information blocks on a disc-shaped record carrier of a type which is rewritable in, for example a magneto-optical or optical manner (via phase change) by means of a beam of electromagnetic radiation. The record carrier is identical to the record carrier shown in FIGS. 1 land 2. During the writing operation, marks representing the information are formed on the record carrier. The device is provided with drive means 45 for rotating the record carrier 1, and a write head 42 for scanning the track. The device is further provided with a system control unit 46 for receiving commands from a controlling computer system or from a user and for controlling the device. To this end, the system control unit comprises, for example a microprocessor, a program memory and control gates for performing the procedures, described below and for controlling said elements. The system control unit may also be implemented as a state machine in logic circuits. The write head 42 is positioned in the radial direction on the track by positioning means 44, with position information from the track being detected. In accordance with known tracking and focusing methods, the write head scans the track, with, for example a modulation being present in the tracking signal due to a wobble in a servopattern. The tracking signal is demodulated and the position information coded therein is regained in the positioning means 44 and passed on to the system control unit 46. The radial position of the write head can be verified by means of the regained position information. The information presented to the input of the writing means 41 is distributed, if necessary, into information blocks and converted into a write signal for the write head 42. The writing means 41 comprise, for example an error coder and a channel coder. According to the invention, the writing device is provided with clock means 30 for generating the bit clock as described above with reference to FIG. 3, which bit clock is coupled to the writing means 41. The system control unit 46 controls the positioning means 44, the writing means 41 and the drive means 45 and is equipped for computing the winding numbers and angular position within the winding on the basis of the address of an information block. The system control unit performs this computation in full bit lengths (and possibly simple rational fractions) without rounding errors being produced. The system control unit uses the ratio between the increase of the length per winding and the bit length as described with reference to FIG. 2. The ratio between track pitch and bit length may assume a given rational value which can be expressed in a formula as follows:

$$B_l = \frac{n}{m} * \pi * T_p$$

If n=2, the length per winding increases by exactly an integral number of in bit lengths. At n=4, half bit lengths are also possible, for example at n=4 and at m=51, there are 25.5 extra bit lengths per winding. For a given system, the parameters m and n can be chosen to be such that the minimum usable bit length is obtained at a given track pitch and, moreover, an integral number of bits per winding is obtained. In an embodiment of the writing device, the clock means are adapted to generate the bit clock for a number of values of m for realizing different bit lengths at a given track pitch. Dependent on operational circumstances or previously made choices, the bit length can be chosen from a (limited) number of possibilities. This has the advantage that within a standardized system the same record carrier can be written and read in different devices which then always apply the same bit length. In addition, a different record carrier with a different bit length can be written, for example if this record carrier has a better quality. This is an additional advantage if the technique of providing and reading marks is improved with time, so that smaller marks can be used. In a device, both older record carriers with large bit lengths and new record carriers with smaller marks can be written. The bit length used is preferably recorded in proportion to the track pitch on the record carrier, for example as the proportional numbers m and n.

Figure 5:
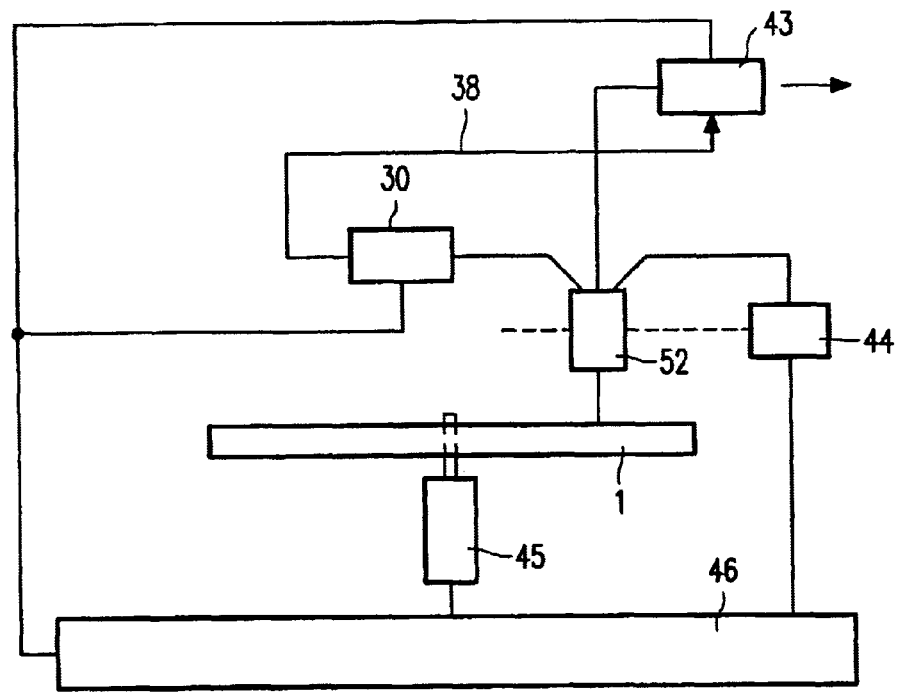
FIG. 5 shows a device for reading information blocks.

FIG. 5 shows a reading device according to the invention for reading information blocks. The reading device is provided with drive means 45 for rotating the disc-shaped record carrier 1, and a read head 52 for scanning the track on the record carrier. The read head 52 is positioned in the radial direction on the track by positioning means 44 on the basis of signals derived from marks of the record carrier. In accordance with the conventional Differential Phase Detection or Differential Time Detection system (DPD or DTD), for example the reflected radiation can be received on a detector (not shown), which detector is subdivided into 4 sub-detectors. By determining phase or time differences between the signals of the sub-detectors, the position of the scanning spot with respect to the series of marks recorded in the track can be determined. During reading, the signal of the read head 52 is converted into the information in the reading means 43, for example comprising a channel decoder and an error corrector. According to the invention, the device is provided with clock means 30 for generating the bit clock as described with reference to FIG. 3. The device is further provided with a system control unit 46 for controlling the device, which system control unit has functions corresponding to those of the system control unit of the writing device. The bit clock is coupled to the reading means 43 and is generated independently of the marks in the track. This is an advantage when an information block subsequent to a non-written area is written because the bit clock prior to the information block has then already been set to the correct value. In reading devices of the conventional type, the bit clock is regained from the read signal, for example via a PLL which then locks in on the read signal. In an embodiment of the reading device according to the invention, the clock means are adapted to additionally lock in on the marks. The frequency of the bit clock is then controlled both by the position, as in FIG. 3, and by a difference between the bit clock and the read signal of the marks. The position control has the advantage that the additional lock-in range of the bit clock can be limited to a great extent because the desired frequency has substantially been computed and set. A correction of the phase and, if necessary a small correction of the frequency are then performed by the additional lock-in on the basis of the marks. The additional lock-in is realized by controlling the clock means 30 only with the computed block and/or possibly with pulses of synchronizing elements during a jump or when there are non-written areas. It is alternatively possible to start from synchronizing pulses derived from the drive means 45, such as tacho pulses or control pulses from a synchronous motor. When the read head 52 is positioned on a written area and marks can be read, an extra control signal is generated and applied to the control input of the clock means. This extra control signal is generated, for example by comparing the bit clock with the read signal in a phase comparator, and, based on the phase difference, the PLL is readjusted in the clock means 30. This provides the advantage that the bit clock is substantially determined by the exactly computed value based on the radial position and on the track pitch information, the winding number and the rotational speed, because the lock-in range can thereby be limited to a very large extent so that the bit clock is less sensitive to disturbances caused by, for example dirt on the surface of the record carrier.

What is claimed is:

1. A system comprising:
   a disc-shaped record carrier; and
   means for writing and/or reading information in/from windings on the record carrier;
   and in which:
   the information is represented by marks arranged in bit cells having a predetermined hit length along the windings;
   the bit length is constant for consecutive windings; and
   a pitch of the windings is selected so that the lengths of consecutive windings each differ by a predetermined non-zero integral multiple and/or simple rational fraction of the bit length of the bit cells, a simple rational fraction being a fraction having a numerator and denominator sufficiently small for integer computations in the system; and
   the system further comprising means for integer computation of a position on the record carrier depending on the integral multiple and/or simple rational fraction of the bit length.

2. A disc-shaped record carrier comprising:
   a substrate;
   multiple consecutive windings on the substrate;
   a servopattern arranged in accordance with the windings to indicate windings intended for recording; and
   information means recorded in the windings for representing information with marks arranged in bit cells having a predetermined bit length $B_1$;
   and in which:
   the windings have a different height with respect to regions between the windings, borders between the windings and the regions being wobbled to provide the servopattern;
   the windings on the record carrier are arranged with a pitch $T_p$ such that $n*\pi*T_p = m*B_1$;
   n and m are both positive predetermined integers sufficiently small for integer computations of position in a reading device for the record carrier; and
   the bit length is constant for consecutive windings.

3. The carrier of claim 2, in which n=2 when n/m is in irreducible form.

4. The carrier of claim 2, in which n=4 when n/m is in irreducible form.

5. The carrier of claim 2, in which a reference point is provided in a winding at a radius R, such that the length of the windings from the reference point to another winding is an integral multiple or an integral multiple plus a simple rational fraction of the bit length of the bit cells.

6. The carrier of claim 2, in which the servopattern is provided with a modulation in which disc information is coded, the disc information including pitch information which indicates a ratio between the bit length of the bit cells and the pitch.

7. The carrier of claim 5, in which the disc information includes reference length information which indicates a ratio between the bit length of the bit cells and the length of the winding, from the reference point.

8. A device comprising:
   means for writing and/or reading information in/from a track on a disc-shaped record carrier, with consecutive windings having a pitch $T_p$, and in which: the information is represented by marks organized in bit cells having a bit length $B_1$; and the bit length is constant for consecutive winding; and
   clock means for generating a bit clock synchronously with the bit cells during scanning of the track, the bit clock having a predetermined relation with the pitch $T_p$, such that $m*B_1 = n*\pi*T_p$, and in which n and m are both positive predetermined integers sufficiently small for integer computations in the device.

9. The device of claim 8, in which n=2 when n/m is in irreducible form.

10. The device of claim 8, in which the clock means generate the bit clock for a number of values of in for realizing different bit lengths of the bit cells at a given pitch.

11. The device of claim 8, in which the clock means generate the bit clock during scanning a winding depending upon: a radius R on which a reference point is provided; the number of windings between the reference point and the winding; and the winding pitch.

12. The device of claim 8, in which the record carrier is provided with a servopattern in which a predetermined number of synchronizing elements per winding is present in the servopattern and the clock means generate the bit clock depending upon the synchronizing elements and the radial position of the winding.

13. The device of claim 12, in which the clock means include an oscillator that is controlled depending on a difference between a synchronizing signal based on the synchronizing elements and a fraction of the bit clock, the fraction being determined from the pitch $T_p$, the bit length $B_1$ of the bit cells and a winding number which indicates the number of windings from a reference point at a radius R.

14. A system, comprising:

a read and/or write head; and means for writing and/or reading intonation in/from multiple consecutive windings on a record carrier;

and in which:

the information is represented by marks arranged in bit cells having a bit length;

the bit length is constant for consecutive windings; and lengths of consecutive windings that differ by a predetermined non-zero integral multiple and/or simple rational fraction of the bit length of the bit cells, a simple rational fraction being a fraction having a numerator and denominator sufficiently small for integer computations in the system; and the system further comprising means for integer computation of a position on the record carrier depending on the integral multiple and/or simple rational fraction of the bit length.

15. A system, comprising:

a read and/or write head; and means for writing and/or reading information in/from multiple consecutive windings on a record carrier, the information being represented by marks arranged in bit cells having a predetermined bit length $B_1$;

and in which:

the bit length is constant for consecutive windings the windings on the record carrier are arranged with a pitch $T_p$ such that $n*\pi*T_p=m*B_1$; and n and m are both positive predetermined integers sufficiently small for integer computations of position in a reading device for the record carrier; and the system further comprising means for integer computation of a position on the record carrier depending on the integral multiple and/or simple rational fraction of the bit length.

16. A disc-shaped record carrier comprising:

a substrate;

windings on the substrate having a pitch $T_6$;

a servopattern arranged in accordance with the windings indicating a winding intended for recording; and information means recorded in the windings for representing information with marks arranged in bit cells having a bit length;

and in which:

the windings have a different height with respect to regions between the windings, borders between the windings and the regions being wobbled to provide the servopattern;

the bit length is constant for consecutive windings; and the lengths of consecutive windings differ by a predetermined non-zero integral multiple and/or simple rational fraction of the bit length of the bit cells, a simple rational fraction being a fraction having a numerator and denominator sufficiently small for integer computations in the system.

17. The carrier of claim 2 in which n≦8 when n/m is in irreducible form.

18. The carrier of claim 2 in which the windings form a single spiral track.

19. The system of claim 14 in which:

the windings form a single spiral track;

the windings on the record carrier are arranged with a pitch $T_p$ such that $n*\pi*T_p=m*B_1$, in which $B_1$ is a predetermined bit length of the bit cells and n and in are both positive predetermined integers sufficiently small for integer computations of position in a reading device for the record carrier;

n≦8;

a reference point is provided in a winding at a radius R, such that the length of the windings from the reference point to another winding is an integral multiple and/or simple rational fraction of the bit length of the bit cells;

the servopattern is provided with a modulation in which disc information is coded, the disc information including pitch information which indicates a ratio between the bit length of the bit cells and the pitch;

the disc information includes reference length information which indicates a ratio between the bit length of the bit cells and the length of the windings from the reference point;

the system further comprising clock means for generating a bit clock synchronously with the bit cells during scanning of the track, the bit clock having a predetermined relation with the pitch, such that $m*B_1=n*\pi*T_p$;

the clock means generate the bit clock for a number of values of in for realizing different bit cell lengths at a given pitch;

the clock means generate the bit clock during scanning a winding depending upon: a radius R on which a reference point is provided; the number of windings between the reference point and the winding; and the winding pitch;

the record carrier is provided with a servopattern in which a predetermined number of synchronizing elements per winding is present in the servopattern and the clock means generate the bit clock depending upon the synchronizing elements and the radial position of the winding; and the clock means include an oscillator that is controlled depending on a difference between a synchronizing signal based on the synchronizing elements and a fraction of the bit clock, the fraction being determined from the pitch $T_p$, the bit length $B_1$ of the bit cells and a winding number which indicates the number of windings from a reference point at a radius R.

20. The system of claim 16 in which:

the windings form a single spiral track;

the windings on the record carrier are arranged with a pitch $T_p$ such that $n*\pi*T_p=m*B_1$, in which $B_1$ is a predetermined bit length of the bit cells and n and in are both positive predetermined integers sufficiently small for integer computations of position in a reading device for the record carrier;

n≦8;

a reference point is provided in a winding at a radius R, such that the length of the windings from the reference point to another winding is an integral multiple and/or simple rational fraction of the bit length of the bit cells;

the servopattern is provided with a modulation in which disc information is coded, the disc information including pitch information which indicates a ratio between the bit length of the bit cells and the pitch;

the disc information includes reference length information which indicates a ratio between the bit length of the bit cells and the length of the windings from the reference point; and the record carrier is provided with a servopattern in which a predetermined number of synchronizing elements per winding is present in the servopattern.

21. A system, comprising:

a disc-shaped record carrier;

means for writing and/or reading information in/from windings on the record carrier, the windings have a different height with respect to regions between the windings, borders between the windings and the regions being wobbled to provide a servopattern; and means to control the writing and/or reading in response to the servopattern;

and in which:

the information is represented by marks arranged in bit cells having a predetermined bit length along the windings;

the bit length is constant for consecutive windings; and a pitch of the windings is selected so that the lengths of consecutive windings differ by a predetermined simple rational fraction of the bit length of the bit cells, a simple rational fraction being a fraction having a numerator and denominator sufficiently small for integer computations in the system.

22. A system, comprising:

a read and/or write head;

means for writing and/or reading information in/from multiple consecutive windings on a record carrier, the windings having a different height with respect to regions between the windings, borders between the windings and the regions being wobbled to provide a servopattern; and means to control the writing and/or reading in response to the servopattern;

and in which:

the information is represented by marks arranged in bit cells having a bit length;

the bit length is constant for consecutive windings; and lengths of consecutive windings differ by a simple rational fraction of the bit length of the bit cells, a simple rational fraction being a fraction having a numerator and denominator sufficiently small for integer computations in the system.

23. A system, comprising:

a read and/or write head;

means for writing and/or reading information in/from multiple consecutive windings on a record carrier, the information being represented by marks arranged in bit cells having a predetermined bit length $B_1$, the windings having a different height with respect to regions between the windings borders between the windings and the regions being wobbled to provide a servopattern; and means to control the writing and/or reading in response to the servopattern;

and in which:

the bit length is constant for consecutive windings;

the windings on the record carrier are arranged with a pitch $T_p$ such that $n*\pi*T_p=m*B_1$; and n and m are both positive predetermined integers sufficiently small for integer computations of position in a reading device for the record carrier.

24. A system comprising:

a disc-shaped record carrier; and means for writing and/or reading information in/from windings on the record carrier;

and in which:

the information is represented by marks arranged in bit cells having a predetermined bit length along the windings;

the bit length is constant for consecutive windings; and a pitch of the windings is selected so that the lengths of consecutive windings differ by a predetermined simple rational fraction of the bit length of the bit cells, a simple rational fraction being a fraction having a numerator and denominator sufficiently small for integer computations in the system.

25. A system, comprising:

a read and/or write head; and means for writing and/or reading information in/from multiple consecutive windings on a record carrier;

and in which:

the information is represented by marks arranged in bit cells having a bit length;

the bit length is constant for consecutive windings; and lengths of consecutive windings differ by a predetermined simple rational traction of the bit length of the bit cells, a simple rational fraction being a fraction having a numerator and denominator sufficiently small for integer computations in the system.

26. A system comprising:

a read and/or write head; and means for writing and/or reading information in/from multiple consecutive windings on a record carrier, the information being represented by marks arranged in bit cells having a predetermined bit length $B_1$;

and in which:

the bit length is constant for consecutive windings;

the windings on the record carrier are arranged with a pitch $T_p$ such that $n*\pi*T_p=m*B_1$;

n and m are both positive predetermined integers sufficiently small for integer computations of position in a reading device for the record carrier; and n<1 when n/m is in irreducible form.

27. A disc-shaped record carrier comprising;

a substrate;

multiple consecutive windings on the substrate;

a servopattern arranged in accordance with the windings to indicate windings intended for recording; and information means recorded in the windings for representing information with marks arranged in bit cells having a predetermined bit length $B_1$;

and in which, the windings on the record carrier are arranged with a pitch $T_p$ such that $n*\pi*T_p=m*B_1$;

n and m are both positive predetermined integer sufficiently small for integer computations of position in a reading device for the record carrier;

n<1 when n/m is in irreducible form; and the bit length is constant for consecutive windings.

28. A disc-shaped record carrier comprising:

a substrate;

windings on the substrate having a pitch $T_p$;

a servopattern arranged in accordance with the windings indicating a winding intended for recording; and information means recorded in the windings for representing information with marks arranged in bit cells having a bit length;

and in which:

the bit length is constant for consecutive windings; and the lengths of consecutive windings differ by a predetermined simple rational fraction of the bit length of the bit cells, a simple rational fraction being a fraction having a numerator and denominator sufficiently small for integer computations in the system.

29. A device comprising:

means for writing and/or reading information in/from a track on a disc-shaped record carrier, with consecutive windings having a pitch $T_p$, and in which: the information is represented by marks organized in bit cells having a bit length $B_1$; and the bit length is constant for consecutive winding; and clock means for generating a bit clock synchronously with the bit cells during scanning of the track, the bit clock having a predetermined relationship with the pitch such that the time required for rotations of consecutive windings differ by a predetermined non-zero integral multiple and/or simple rational fraction of the bit clock, a simple rational fraction being a fraction having a numerator and denominator sufficiently small for integer computations in the system.

\* \* \* \* \*